United States Patent Office 2,849,447
Patented Aug. 26, 1958

2,849,447

NITRO DIARYLAMINE METHINE DYES

Nicholas J. Kartinos, Niles, Ill., and William W. Williams, New York, N. Y., assignors to General Aniline & Film Corporation, New York, N. Y., a corporation of Delaware No Drawing. Application September 19, 1955
Serial No. 535,261

11 Claims. (Cl. 260—239.7)

This invention relates to new and useful compounds free of solubilizing groups such as carboxyl and sulfonic acid and having the following general formula:

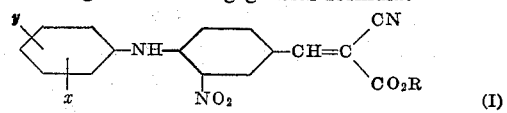

wherein $x$ and $y$ may be hydrogen, nitro, alkyl, preferably lower alkyl, such as methyl, ethyl, n-propyl, isopropyl, and the like; alkoxy, such as methoxy, ethoxy, and the like; halogen, for example, chlorine, bromine, and the like; and

wherein $R_1$ and $R_2$ may be hydrogen, alkyl, alkoxy, hydroxyalkyl, acyl, or wherein $R_1$ and $R_2$ may form a heterocyclic ring; i. e., morpholino; R may be alkyl, preferably lower alkyl, for example methyl, ethyl, n-propyl, isopropyl, isobutyl, and the like; haloalkyl such as chlorethyl, bromethyl and the like; and hydroxy- or cyano-substituted alkyl, for example, cyanoethyl, hydroxyethyl, and the like.

While nitro diarylamine type dyes, heretofore known and as exemplified in U. S. Patents 2,119,123, 2,200,343 and 2,212,825, among numerous others, exhibit excellent light- and acid-fastness on acetate, they are, nevertheless, quite deficient in numerous other desirable properties. Thus, they in general, give dull shades and poor wash-fastness and, in addition, have poor affinity on acetate fibers. On the other hand, methine type dyes heretofore known, such as are described in United States Patents 1,950,421, 2,179,895, and many others, exhibit bright shades, give fair wash-fastness, and have excellent affinity on acetate fibers, but are very poor in their acid-fastness properties. Further, the nitro diarylamine type dyes, while being excellent dyes for synthetic fibers, such as Dacron, are again on the dull side and have only fair affinity for such fibers. The methine type dyes are of limited utility on these fibers.

We have discovered that the dyes of the aforementioned type (I) give bright shades on acetate and Dacron, with excellent wash-, light- and acid-fastness. In addition, the dyes of this invention also have excellent affinity on acetate, Dacron, and the like. The dyestuffs of this invention are readily prepared by a two-step process involving first, the condensation of 4-chloro-3-nitrobenzaldehyde with an ester of cyanoacetic acid to yield an ester of α-cyano-3-nitro-4-chloro-cinnamic acid having the formula

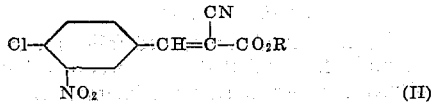

The second step of the process involves a further condensation of compounds of type (II) with monocyclic, carbocyclic, primary aromatic amines yielding the novel compounds of type (I). The esters of cyanoacetic acid which may be employed in the first step of this process include the following:

Methyl-cyanoacetate
Ethyl-cyanoacetate
Hydroxyethylcyanoacetate
Chloroethylcyanoacetate
Cyanoethylcyanoacetate—and the like.

The primary aromatic amines which are suitable and operative in the second step of the instant process include the following:

Aniline
o-Toluidine
m-Toluidine
p-Toluidine
o-Ethyl aniline
m-Ethyl aniline
p-Ethyl aniline
o-Propyl aniline
p-Propyl aniline
m-Xylidene (2,4-dimethylaniline)
2,3-dimethylaniline
2,6-dimethylaniline
3,4-dimethylaniline
3,5-dimethylaniline
o-Anisidine
m-Anisidine
p-Anisidine
o-Phenetidine
p-Phenetidine
o-Bromoaniline
m-Bromoaniline
p-Bromoaniline
o-Chloroaniline
p-Chloroaniline
m-Chloroaniline
o-Nitroaniline
m-Nitroaniline
p-Nitroaniline
2,4-dibromoaniline
2,4-dichloroaniline—and the like
2,3-dichloroaniline
2,5-dichloroaniline
3,4-dichloroaniline
3,5-dichloroaniline
$N^1$methyl sulfanilamide
$N^1N^1$dimethyl sulfanilamide
$N^1$ethyl sulfanilamide
$N^1$propyl sulfanilamide
$N^1$benzoyl sulfanilamide
Sulfanilamide In the general process of the preparation of compound type (I), the first condensation step involving the preparation of the intermediate compounds of type (II), there may be employed either an aqueous or an anhydrous organic solvent. The reactants are usually brought together in substantially equimolecular proportions in the presence of an aqueous or an anhydrous solvent and, additionally, a basic catalyst, preferably a secondary or tertiary amine (aliphatic or heterocyclic) to promote the condensation. Elevated temperatures may be employed up to the reflux temperature of the reaction mass.

The second condensation step involving the reaction of compounds of type (II) with primary aromatic amines is also preferably conducted in a solvent or suspension medium in the presence of an acid binder and, again, preferably employing elevated temperatures to accelerate the condensation reaction. As with the first step in the process, such temperatures may be up to the reflux temperature of the reaction mass. Among the compounds which may be employed as solvents, diluents, or suspension media for the condensation reactions are the following:

Alcohols, preferably the lower alcohols, such as methanol, ethanol, 2-propanol, n-butanol, and the like; lower ketones, such as acetone, diethylketone, and the like; aromatic hydrocarbons, such as benzene, toluene, xylene, and the like; water, and any of the other commonly employed organic solvents which do not adversely affect the course of the condensation reaction or interfere therewith.

As suitable acid binders in the second condensation step resulting in the novel compounds of type (I), one may employ: the basic salts and oxides of the alkali and alkaline earth metals, such as sodium acetate, potassium carbonate, sodium bicarbonate, magnesium and calcium oxides, and the like; organic bases, such as tertiary amines (e. g., pyridine); or an excess of the primary amine.

The dyestuffs prepared in accordance with this invention are essentially water-insoluble compounds which may be employed either in aqueous dye baths or in organic solvent solutions to effect dyeings on textile products. In aqueous dye baths the dyestuff is present as a dispersion or suspension and such dispersions or suspensions may readily be obtained, in general, by dissolving the dyestuff in a small amount of solvent, such as acetone or ethanol, to which an additional small amount of a wetting agent has been added. This dyestuff and wetting agent solution is then drowned in hot water, resulting in the dyestuff dispersion.

To exemplify this procedure, 10 mgm. dyestuff is dissolved in 2 mls. acetone, 2 mls. ethanol, and 2 g. sodium N-methyl N-oleyl taurate. Hot water is then added to bring the volume to 300 mls. The resultant aqueous dispersion of dyestuff is then ready to be employed in the dyeing of textiles, and the like. More permanent dispersions of the dyestuff may be obtained by grinding the dye to a paste in the presence of a dispersing agent, such as a sulfonated oil, soap, sodium lignin sulfonate, sodium N-methyl N-oleyl taurate, formaldehyde condensation products with naphthalene sulfonic acids, alkylphenoxy, polyoxyalkylene ethanols, polyoxyethylated fatty alcohols and fatty acids, and the like.

The grinding or kneading of the dyestuff or dispersing agent may be done in any of the mixers well known for such purposes as, for example, a Werner-Pfleiderer mixer. The resulting paste may be used directly or dry ground and safely stored for later use. In dyeing processes with the dyestuffs of this invention, it is preferred that the textile material to be dyed or colored be added to the dye bath at a lower temperature than that at which the major portion of the dyeing is to be conducted. This latter temperature may be varied, depending upon the particular material undergoing coloration. The amount of dye to be employed in the dye bath may also be varied, depending upon the intensity of coloration desired, and the particular nature of the material to be dyed. As a general rule, the amount of dye employed may vary from ½–3% by weight of the textile material, although it is understood that lesser or greater amounts may be used when so desired.

The following examples, in which parts are by weight unless otherwise indicated, are illustrative of the instant invention and are not to be regarded as limitative thereof. Unless otherwise indicated, parts by weight are in grams and parts by volume are in cc.

EXAMPLE 1

Preparation of ethyl α-cyano-3-nitro-4-anilino cinnamate having the formula:

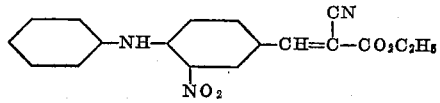

About 14 parts of ethyl α-cyano-3-nitro-4-chloro cinnamate, 6 parts of aniline, 50 ml. ethanol, and 4.2 parts sodium bicarbonate are combined and heated under reflux overnight. The mixture is drowned in ice-water, stirred, and the bright red-orange solid that results is collected, washed, and dried. There is obtained 16 g. of a material melting at 136–40° C. (95% of theory).

After crystallization from 2-propanol the material gave a melting point of 142–44° C.

Calcd. for $C_{18}H_{15}O_4N_3$; N, 12.46, found 12.57.

The intermediate ethyl α-cyano-3-nitro-4-chloro-cinnamate is prepared in the following manner:

About 93 parts 4-chloro-3-nitrobenzaldehyde (Hodgson, J. Chem. Soc., 1927, 24), 72 parts ethyl cyanoacetate in 250 parts 2-propanol with a catalytic amount of piperidine (10 drops) are combined and heated under reflux for 30 minutes. Upon cooling, the separated solid is collected, washed with 2-propanol, and dried. There is obtained 112.5 g. ethyl α-cyano-3-nitro-4-chloro cinnamate; melting point, 141–3° C.

EXAMPLE 2

Preparation of ethyl α-cyano-3-nitro-4-(p-methoxyanilino)-cinnamate having the formula:

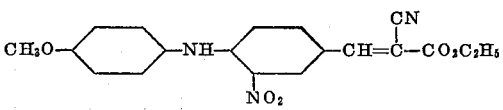

About 2 parts ethyl α-cyano-3-nitro-4-chloro cinnamate, 1.23 parts p-anisidine, 0.8 part sodium acetate, and 25 parts 2-propanol are combined and heated under reflux several hours. The mixture is drowned in ice water and the resulting solid collected, washed and dried. There is obtained 2.3 parts product of the above formula.

EXAMPLE 3

Preparation of ethyl α-cyano-3-nitro-4-(p-ethoxyanilino) cinnamate having the formula:

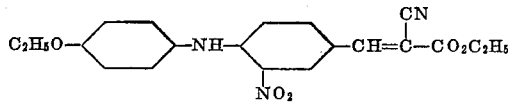

This compound is prepared following the procedure of Example 2, except that 1.37 parts p-phenetidine are substituted for the p-anisidine of Example 2. There is obtained 2.6 parts of the compound of the above formula, having a melting point of 165° to 171° C.

EXAMPLE 4

Preparation of ethyl α-cyano-3-nitro-4-(p-methylanilino)-cinnamate having the formula:

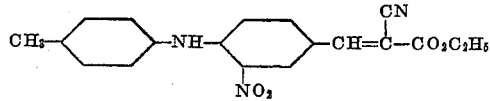

This compound is prepared following the procedure of Example 2, except that 1.07 parts of p-toluidine are substituted for the p-anisidine of Example 2.

There is obtained 2.1 parts of the dyestuff of the above formula.

EXAMPLE 5

Preparation of ethyl α-cyano-3-nitro-4-(o-methyl aniline)-cinnamate having the formula:

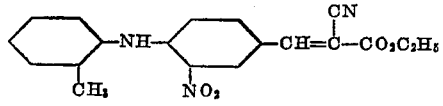

This compound is prepared following the procedure of Example 2, except that 1.07 parts of o-toluidine are substituted for the p-anisidine of Example 2.

There is obtained 1.7 parts of the dyestuff of the above formula.

EXAMPLE 6

Preparation of ethyl α-cyano-3-nitro-4-(p-nitroaniline)-cinnamate, having the formula:

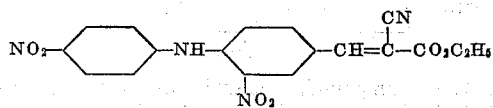

This compound is prepared following the procedure of Example 2, except that 1.38 of p-nitroaniline are substituted for the p-anisidine of Example 2.

There is obtained 2.3 parts of the dyestuff of the above formula, having a melting point of 103–110° C.

EXAMPLE 7

Preparation of methyl α-cyano-3-nitro-4-(2′methyl-4′ sulfonmorpholineaniline) cinnamate, having the formula:

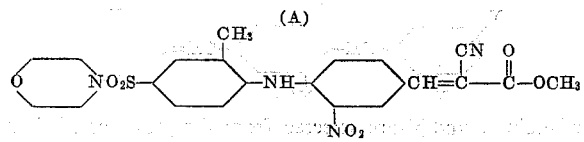

About 2 parts of methyl α-cyano-3-nitro-4-chloro cinnamate, prepared similarly as the ethyl ester (described in Example 1) but employing an equivalent amount of methyl cyanoacetate in lieu of the ethyl ester described above, 0.8 part sodium acetate, 25 parts 2-propanol, and 2.5 parts of 2-methyl-4-sulfonmorpholino aniline are combined and heated under reflux for several hours. The mixture is drowned in ice water and the resulting solid collected, washed and dried. There is obtained 3.1 parts of the product of the above formula.

The intermediate 2-methyl-4-sulfonmorpholino aniline is prepared in the following manner:

To 1000 g. of chlorosulfonic acid, at 80° C., there is added over a period of about 1 hour, with constant stirring, 275 g. of o-nitrotoluene. After the addition is completed, the temperature is raised to 130° C. and stirring is continued for five hours. The reaction mass is then drowned in ice water slush, stirred, filtered, and the filter cake washed with ice water. The resultant product has the formula:

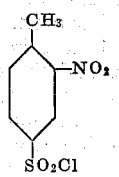

To 250 g. morpholine in 5 liters of ice water slush there is added slowly, over a period of 30 minutes, 240 g. of the above prepared sulfonyl chloride. The mass is continuously stirred for 5 hours, after which the temperature is raised to 60° C., and 150 ml. of 18% hydrochloric acid is added. The slurry is then cooled to 15° C., filtered, and washed with ice water. Presscake yield 250 g. of product of the formula:

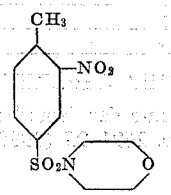

Into a 5-liter flask, equipped with a stirrer, thermometer, condenser and heating mantle there is charged a hot solution of 900 g. sodium sulfide .9H$_2$O in 1800 mls. water. Then 400 ml. of 40% NaOH (4 moles) is added. The solution is heated to 90° C. and the presscake above is added. The reaction mixture is refluxed for 3½ hours at 105° C. The charge is filtered by suction. The presscake is then stirred into 2100 ml. of 18.5% hydrochloric acid at a temperature of 95° C., and this mass is then filtered hot. The sulfur cake is washed with 1000 mls. hot water. To the combined filtrate and washings is added 150 ml. 40% sodium hydroxide to a pH=7.5. The slurry is cooled to 10° C. and filtered. The filter cake is washed with ice water and air dried. The resultant product has the formula:

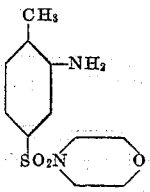

The product of Examples 1–7, when employed in the conventional dyeing procedures for acetate and Dacron, give yellow shades of excellent light- and wash-fastness. The dyestuffs also exhibit outstanding affinity for their fibers.

The following examples will illustrate such dyeing processes:

Example A 0.2 g. of a dye composition comprising

55% of the dyestuff of Example 1,
37% sodium lignin sulfonate and
8% sodium sulfate is dispersed in 250 ml. water.

Then a 10 g. piece of acetate cloth is added and the dyebath temperature is raised to 190° F. and held there for 1 hour, after which the cloth is removed, rinsed and dried. The exhaust of the dye from the bath is excellent with a very level dyeing resulting, nevertheless. A greenish-yellow shade is obtained, having excellent light- and wash-fastness.

Example B

The procedure of Example A is repeated, except that a 10 g. sample of Dacron is used instead of acetate, and the dyeing is carried out at the "boil" for 1½ hours. Similar dyeings are obtained as in Example A.

Example C

The dyeing procedure described in Example A is repeated, employing as the dye composition the following:

50% dyestuff of Example 2
40% sodium N-methyl, N-oleoyl taurate
10% sodium sulfate 0.2 g. of the above composition is dispersed in 300 ml. water and the dyeing of the acetate is carried out as in Example A. The results as to exhaust, light- and wash-fastness are comparable to that obtained in Example A. The affinity of the dyestuff for the acetate cloth is excellent. The cloth is dyed a reddish-yellow shade.

Example D

The composition described in Example C is employed to dye Dacron in the manner described in Example B. 0.15 g. of the dye composition in 300 ml. water is employed for the dyebath. The results are comparable in light- and wash-fastness to those obtained in Example B. The cloth is dyed a reddish-yellow shade.

EXAMPLE 8

Preparation of ethyl α-cyano-3-nitro-4-sulfanilamido cinnamate, having the formula:

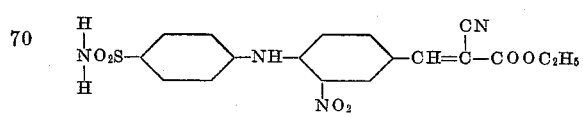

The procedure of Example 1 is repeated, except that 10 parts of sulfanilamide are employed in lieu of aniline.

EXAMPLE 9

Preparation of ethyl α-cyano-3-nitro-4[N¹benzoyl sulfanilamido] cinnamate, having the formula:

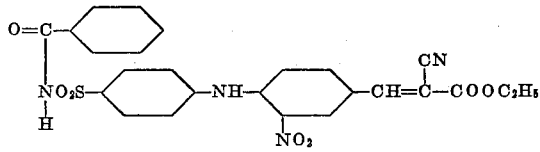

The procedure of Example 8 is repeated, except that 14 parts of N'benzoyl sulfanilamide is used in lieu of sulfanilamide.

Example E 0.2 g. of a composition comprising:

50% dyestuff Example 9
42% sodium lignin sulfonate
8% sodium sulfate is dispersed in 250 ml. of water. A 10 g. sample of acetate cloth is dyed similarly as in Example A. The dyed cloth is of a very pleasing yellow shade and exhibits excellent light- and wash-fastness properties.

Example F 0.2 g. of the composition described in Example E is dispersed in 200 ml. water. A 10 g. sample of Dacron is dyed, following the procedure of Example B. The dyed goods are yellow in shade and have excellent light- and wash-fastness.

This invention has been disclosed with respect to certain preferred embodiments. Various modifications and variations of these embodiments will become apparent to those skilled in the art, and it is to be understood that such modifications and variations are to be included within the spirit and purview of this application and the scope of the appended claims.

We claim:

1. Compounds having the following general formula:

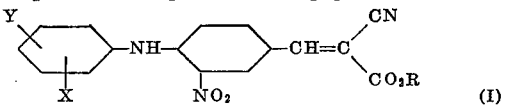

wherein X and Y are selected from the group consisting of hydrogen, nitro, lower alkyl, lower alkoxy, chloro, bromo, and sulfonamide radicals, and R is selected from the group consisting of lower alkyl, chloro lower alkyl, bromo lower alkyl, hydroxy lower alkyl and cyano lower alkyl.

2. The compound, ethyl α-cyano-3-nitro-4-anilino cinnamate, having the formula:

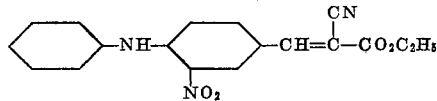

3. The compound, ethyl α-cyano-3-nitro-4-(p-methoxyanilino)-cinnamate, having the formula:

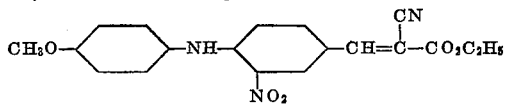

4. The compound, ethyl α-cyano-3-nitro-4-(p-ethoxyanilino) cinnamate, having the formula:

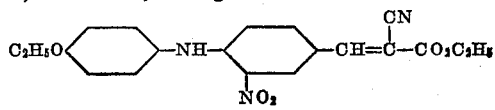

5. The compound, ethyl α-cyano-3-nitro-4-(p-methylanilino)-cinnamate, having the formula:

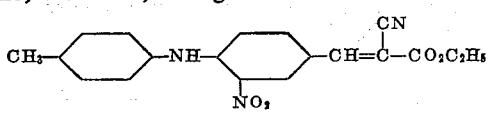

6. The compound, methyl α-cyano-3-nitro-4-(2'-methyl-4'-sulfonmorpholineaniline) cinnamate, having the formula:

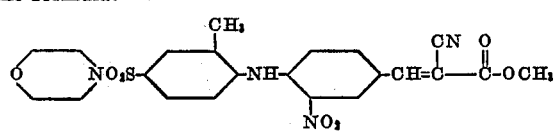

7. The process for the preparation of dyestuffs, having the formula:

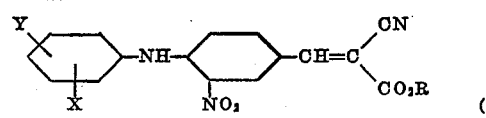

wherein X and Y are selected from the group consisting of hydrogen, nitro, lower alkyl, lower alkoxy, chloro, bromo, and sulfonamide radicals, and R is selected from the group consisting of lower alkyl, chloro lower alkyl, bromo lower alkyl, hydroxy lower alkyl and cyano lower alkyl comprising condensing in the presence of an acid binder and a liquid suspension medium a monocyclic, carbocyclic primary aromatic amine with an ester of α-cyano-3-nitro-4-chlorocinnamic acid having the formula:

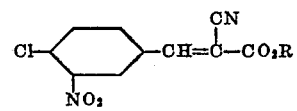

wherein R has the same values as the R in the first-mentioned formula.

8. The process as defined in claim 7, wherein the primary amine is aniline, and the cinnamic acid ester is ethyl-α-cyano-3-nitro-4-chloro cinnamate.

9. The process as defined in claim 7, wherein the amine is p-anisidine, and the cinnamic acid ester is ethyl-α-cyano-3-nitro-4-chloro cinnamate.

10. The process as defined in claim 7, wherein the amine is p-phenetidine, and the cinnamic acid ester is ethyl-α-cyano-3-nitro-4-chloro cinnamate; and the acid binder is sodium acetate, the liquid suspension medium is alcohol, and the reaction is carried out under reflux temperatures.

11. The process as defined in claim 7, wherein the primary amine is 2-methyl-4-sulfonmorpholino aniline, and the cinnamic acid ester is methyl-α-cyano-3-nitro-4-chloro cinnamate.

References Cited in the file of this patent

UNITED STATES PATENTS

| | | |
|---|---|---|
| 1,950,421 | Wahl | Mar. 13, 1934 |
| 2,043,081 | Wahl | June 2, 1936 |
| 2,213,608 | Ritter | Sept. 3, 1940 |

OTHER REFERENCES

Bauer et al., Berichte der deutschen chemische Gesellschaft, vol. 63 B, pp. 2691–95 (1930).